(12) United States Patent
Mirmobin et al.

(10) Patent No.: US 9,551,487 B2
(45) Date of Patent: Jan. 24, 2017

(54) HEAT RECOVERY USING RADIANT HEAT

(71) Applicant: ACCESS ENERGY LLC., Cerritos, CA (US)

(72) Inventors: Parsa Mirmobin, La Mirada, CA (US); Dennis Strouse, Anaheim, CA (US)

(73) Assignee: Access Energy LLC, Cerritos, CA (US)

( * ) Notice: Subject to any disclaimer, the term of this patent is extended or adjusted under 35 U.S.C. 154(b) by 131 days.

(21) Appl. No.: 13/785,817

(22) Filed: Mar. 5, 2013

(65) Prior Publication Data

US 2013/0234439 A1 Sep. 12, 2013

Related U.S. Application Data

(60) Provisional application No. 61/607,064, filed on Mar. 6, 2012.

(51) Int. Cl.
| | |
|---|---|
| *F23D 14/12* | (2006.01) |
| *F01K 25/08* | (2006.01) |
| *F01K 13/00* | (2006.01) |
| *H02K 7/18* | (2006.01) |

(52) U.S. Cl.
CPC ............ *F23D 14/12* (2013.01); *F01K 13/006* (2013.01); *F01K 25/08* (2013.01); *H02K 7/1823* (2013.01)

(58) Field of Classification Search
CPC ........ F23D 14/12; F01K 25/08; F01K 13/006; H02K 7/1823
USPC ... 60/660, 670; 290/52; 431/354; 122/13.01, 15.1, 16.1, 17.1, 19.2
See application file for complete search history.

(56) References Cited

U.S. PATENT DOCUMENTS

| | | | | |
|---|---|---|---|---|
| 2,597,346 A | * | 5/1952 | Leffer | 208/147 |
| 3,581,715 A | * | 6/1971 | Singer | 122/5 |
| 3,901,033 A | * | 8/1975 | McAlister | 60/516 |
| 3,926,582 A | * | 12/1975 | Powell et al. | 48/62 R |
| 4,007,019 A | * | 2/1977 | Slater et al. | 48/197 R |
| 4,055,165 A | * | 10/1977 | Scragg | F24H 1/12 122/367.1 |
| 4,388,892 A | * | 6/1983 | Rody et al. | 122/4 D |
| 4,472,345 A | | 9/1984 | Tanji | |
| 4,593,527 A | | 6/1986 | Nakamoto et al. | |
| 4,706,612 A | * | 11/1987 | Moreno et al. | 122/7 R |
| 4,841,916 A | | 6/1989 | Sumitomo | |

(Continued)

FOREIGN PATENT DOCUMENTS

| | | |
|---|---|---|
| JP | 2006-037760 | 2/2006 |
| KR | 10-2011-0079447 | 7/2011 |

(Continued)

OTHER PUBLICATIONS

U.S. Appl. No. 13/763,795, filed Feb. 11, 2013, Mirmobin et al.

(Continued)

*Primary Examiner* — Hoang Nguyen
(74) *Attorney, Agent, or Firm* — Fish & Richardson P.C.

(57) ABSTRACT

Systems, methods, and apparatuses may involve a burner configured to burn gas to produce burned gas and output radiant heat. A gas valve controlled by the system can regulate the flow of gas to the burner. A heat exchanger associated with a thermal cycle can be used to heat a working fluid of the thermal cycle. The heat exchanger positioned out of a convective heat flow from the burner. A heat valve between the burner and the heat exchanger can be selectively adjustable to adjust heat transfer to the heat exchanger.

25 Claims, 6 Drawing Sheets

(56) References Cited

U.S. PATENT DOCUMENTS

| | | | |
|---|---|---|---|
| 4,850,288 A * | 7/1989 | Hoffert et al. | 110/214 |
| 5,040,470 A * | 8/1991 | Lofton et al. | 110/234 |
| 6,032,467 A | 3/2000 | Oshita et al. | |
| 6,247,315 B1 * | 6/2001 | Marin et al. | 60/672 |
| 6,342,197 B1 | 1/2002 | Senetar et al. | |
| 6,497,098 B2 | 12/2002 | Griffin et al. | |
| 6,751,959 B1 | 6/2004 | McClanahan | |
| 7,007,473 B2 | 3/2006 | Nagatani et al. | |
| 7,200,996 B2 | 4/2007 | Cogswell et al. | |
| 7,356,993 B2 | 4/2008 | Smith | |
| 8,813,498 B2 | 8/2014 | Kopecek et al. | |
| 2002/0066270 A1 | 6/2002 | Rouse et al. | |
| 2003/0213246 A1 | 11/2003 | Coll et al. | |
| 2004/0226296 A1 * | 11/2004 | Hanna et al. | 60/671 |
| 2004/0250538 A1 | 12/2004 | Aldridge et al. | |
| 2005/0097819 A1 * | 5/2005 | Lomax et al. | 48/127.9 |
| 2005/0171736 A1 | 8/2005 | Kang | |
| 2005/0279098 A1 | 12/2005 | Kung | |
| 2006/0083964 A1 | 4/2006 | Edlinger | |
| 2007/0154366 A1 | 7/2007 | Park et al. | |
| 2008/0118796 A1 | 5/2008 | Brandlet | |
| 2009/0071156 A1 | 3/2009 | Nishikawa et al. | |
| 2009/0151654 A1 | 6/2009 | Ando | |
| 2009/0211253 A1 | 8/2009 | Radcliff | |
| 2010/0081103 A1 * | 4/2010 | Kobayashi | C03B 5/235 432/1 |
| 2010/0206248 A1 | 8/2010 | Mok | |
| 2010/0255435 A1 | 10/2010 | Singh et al. | |
| 2010/0291455 A1 | 11/2010 | Biederman et al. | |
| 2010/0307155 A1 | 12/2010 | Kasuya et al. | |
| 2010/0326076 A1 | 12/2010 | Ast et al. | |
| 2011/0048012 A1 | 3/2011 | Ernst et al. | |
| 2011/0171556 A1 | 7/2011 | Sugawara et al. | |
| 2012/0000175 A1 * | 1/2012 | Wormser | C10J 3/463 60/39.12 |
| 2012/0023823 A1 | 2/2012 | D'Agostini | |
| 2012/0023943 A1 | 2/2012 | Freund et al. | |
| 2012/0060502 A1 | 3/2012 | Gartner et al. | |
| 2013/0074497 A1 | 3/2013 | Mori | |
| 2013/0145763 A1 * | 6/2013 | Mirmobin et al. | 60/671 |
| 2013/0199178 A1 | 8/2013 | Kanou et al. | |
| 2013/0234439 A1 * | 9/2013 | Mirmobin et al. | 290/52 |
| 2014/0110939 A1 | 4/2014 | Takahashi et al. | |
| 2014/0174087 A1 | 6/2014 | Mizoguchi et al. | |
| 2014/0311141 A1 | 10/2014 | Mori | |

FOREIGN PATENT DOCUMENTS

| | | |
|---|---|---|
| WO | 2009133619 | 11/2009 |
| WO | 2012043335 | 5/2012 |
| WO | 2013/086337 | 6/2013 |

OTHER PUBLICATIONS

International Search Report and Written Opinion for PCT application No. PCT/US2012/068470 issued on Mar. 28, 2013, 10 pages.

International Search Report and Written Opinion of the International Searching Authority issued in International Application No. PCT/US2014/015109 on May 28, 2014; 14 pages.

Office action received in U.S. Appl. No. 13/763,795 on Dec. 26, 2014, 19 pages.

Office action issued in U.S. Appl. No. 13/707,956 on Feb. 27, 2015, 29 pages.

Final action issued in U.S. Appl. No. 13/707,956 on Jul. 16, 2015, 37 pages.

Final action issued in U.S. Appl. No. 13/763,795 on Jun. 17, 2015, 19 pages.

International Preliminary Report on Patentability, PCT/US2012/068470, Jun. 19, 2014, 7 pages.

* cited by examiner

HEAT RECOVERY USING RADIANT HEAT

TECHNICAL FIELD

This disclosure pertains to heat recovery for thermal cycles, and more particularly, to heat recovery from waste gas that is typically burned in flares and/or incinerators using a radiant heat method.

BACKGROUND

During the production of oil and gas, either in the field or at processing plants, natural gas and/or other flammable process gases are often consumed using a flare, burner or incinerator. Heat may be dissipated as a result of combustion through hot gases in the stack vented out to the environment. Flares, burners and incinerators are used in other applications, as well.

DETAILED DESCRIPTION

The disclosure describes arrangements for capturing waste heat generated from a burning waste gas, for example, an incinerator, a furnace, a burner, a flare, a thermal oxidizer, and/or another system for burning or destroying waste gas. The captured waste heat may be used as heat input to a thermal cycle, including a Rankine cycle and organic Rankine cycle. References made to Rankine cycles or organic Rankine cycles (ORC), however, are examples. Other thermal cycles within the scope of this disclosure include, but are not limited to, Sterling cycles, Brayton cycles, Kalina cycles, and/or other cycles. The concepts herein apply to all thermal cycles where capturing heat from a heat source is required. Similarly fuel used for generating heat may be waste natural gas and/or other fuel sources such as biogas, oil, VOCs and/or other fuel sources.

Figure 1A:
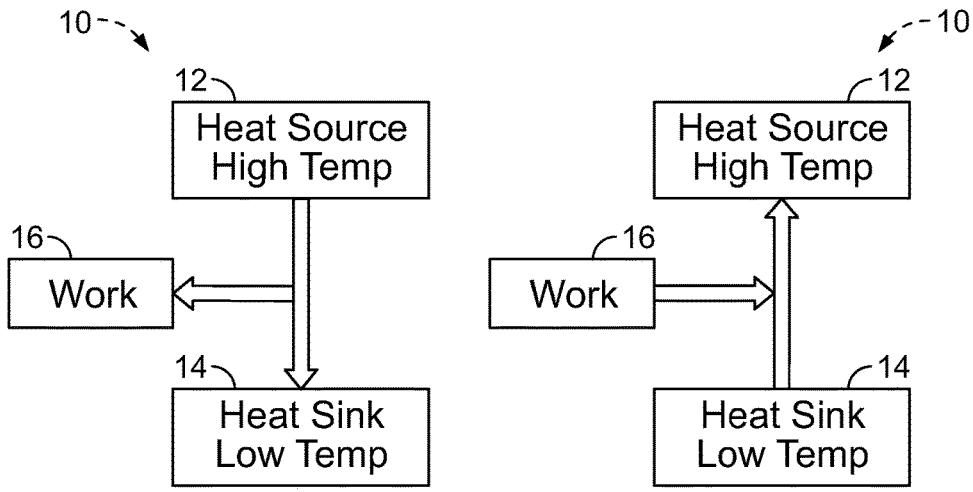
FIG. 1A is a schematic diagram of an example thermal cycle.

FIG. 1A is a schematic diagram of an example thermal cycle 10. The cycle includes a heat source 12 and a heat sink 14. The heat source temperature is greater than the heat sink temperature. Flow of heat from the heat source 12 to heat sink 14 is accompanied by extraction of heat and/or work 16 from the system. Conversely, flow of heat from heat sink 14 to heat source 12 is achieved by application of heat and/or work 16 to the system. Extraction of heat from the heat source 12 or application of heat to heat sink 14 is achieved through a heat exchanger. Systems and apparatus described in this disclosure are applicable to any heat sink 14 or heat source 12 irrespective of the thermal cycle.

Figure 1B:
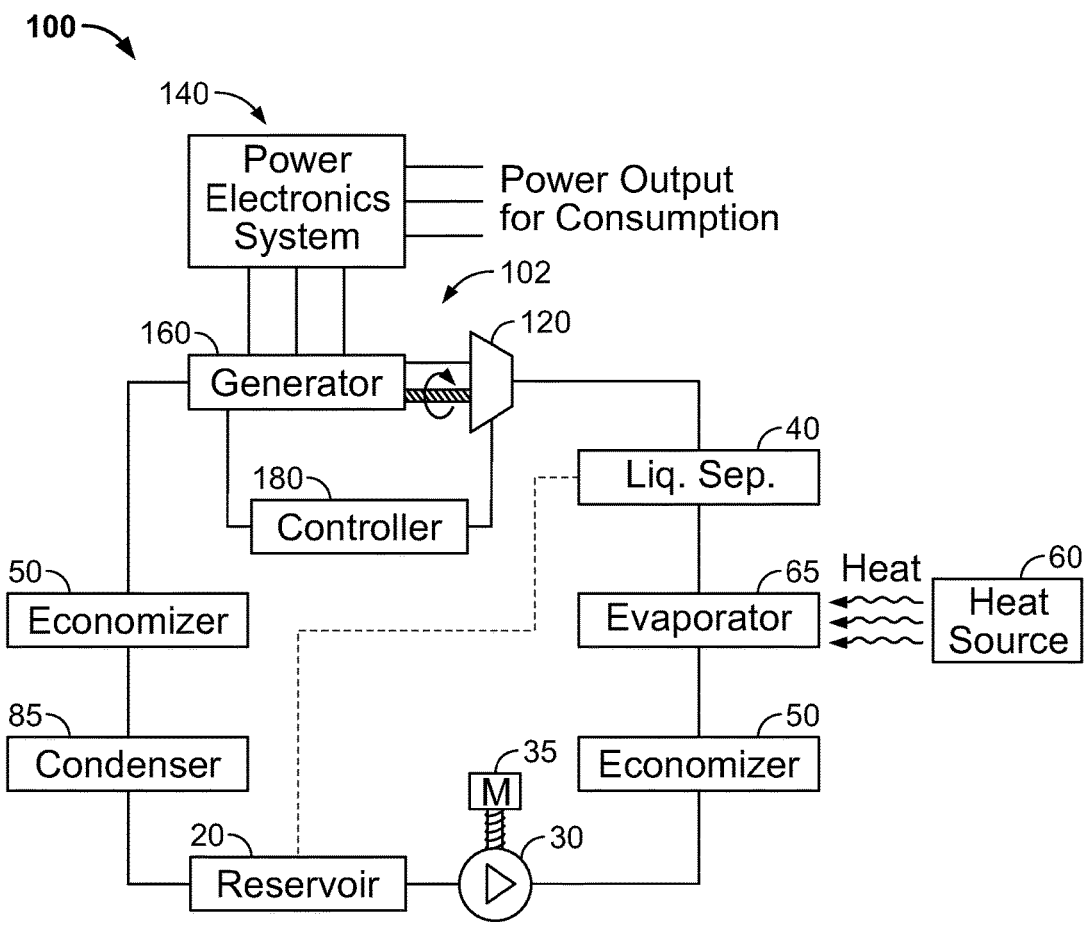
FIG. 1B is a schematic diagram of an example thermal cycle generator system illustrating example Rankine cycle generator system components.

FIG. 1B is a schematic diagram of an example Rankine cycle generator system 100 illustrating example Rankine cycle generator system components. Elements of the Rankine cycle generator system 100 may be integrated into a waste gas burner system and recover waste heat therefrom. The Rankine cycle generator system 100, in certain instances, may be an organic Rankine cycle ("Rankine cycle"), which uses an engineered working fluid to receive waste heat from another process, such as, for example, from the waste gas burner that the Rankine cycle generator system components are integrated into. In certain instances, the working fluid may be a refrigerant (e.g., an HFC, CFC, HCFC, ammonia, water, R245fa, or other refrigerant). In some circumstances, the working fluid in cycle generator system 100 may include a high molecular mass organic fluid that is selected to efficiently receive heat from relatively low temperature heat sources.

A turbine generator apparatus 102 of the Rankine cycle generator system 100 recovers waste heat and converts the recovered waste heat into electrical energy. The turbine generator apparatus 102 includes a turbine 120 and a generator 160. The turbine 120 converts heat energy from a heat source into kinetic energy (e.g., rotation of the rotor). The turbine 120 is configured to receive heated and pressurized working fluid in a vaporous state, which in turn, expands through the turbine 120 to rotate the turbine 120 and cool the working fluid passing through the turbine 120. Turbine 120 is coupled to a rotor of generator 160 using, for example, a common shaft or a shaft coupled to the rotor of the generator 160 by flexible coupling, a rigid coupling, a gear box and/or in another manner. The rotation of the turbine 120 causes the shaft to rotate, which in-turn, causes the rotor of generator 160 to rotate. In certain instances, such as when the turbine 120 is on the same shaft and/or coupled to the rotor by a coupling or a gear box with a 1:1 ratio, the turbine 120 and rotor of the generator 160 can rotate at the same speed. Such a configuration is often referred to as a "high speed" turbine generator 102, because the high speeds at which the turbine 120 inherently operates at are transmitted directly to rotor of the generator 160. In other instances, such as when the turbine 120 is coupled to the rotor via a gearbox with a ratio other than 1:1, the turbine 120 and rotor of the generator 160 can rotate at different speeds. The rotor rotates within a stator to generate electrical power. Such electrical power can be transferred to a power electronics system 140. Turbine may be an axial, radial, screw or other type turbine. The outlet from the turbine 120 may be coupled to exhaust through the generator 160 and cool the generator components.

In certain instances, the generator 160 is a permanent magnet, synchronous alternating current (A/C) generator, for example, having permanent magnets arranged about the rotor and a multiphase A/C windings in the stator. However, the generator 160 can take other forms.

In certain instances, the generator 160 utilizes non-contact magnetic bearings that levitate the rotor within the stator.

The generator 160 can use only magnetic bearings, use a combination of magnetic and other types of bearings, or can use other types of bearings.

The power electronics 140 can operate in conjunction with the generator 160 to condition the power from the generator 160 and provide power at fixed and/or variable voltages and fixed and/or variable frequencies. Such power can be delivered to be used in the system, distributed externally, or sent to a grid. For example, the turbine generator apparatus 102 may output electrical power of a certain phase and voltage to the power electronics 140, and the power electronics 140 configured to convert that power into a form of 3-phase 50/60 Hz power at a voltage of about 380 VAC to about 480 VAC. Alternative embodiments may output electrical power at different power and/or voltages.

Rankine cycle generator system 100 may include a pump device 30 that pumps the working fluid. The pump device 30 may be coupled to a liquid reservoir 20 that contains the working fluid, and a pump motor 35 can be used to operate the pump. The pump device 30 may be used to convey the working fluid to a heat exchanger, e.g. evaporator 65. The evaporator 65 receives heat from a heat source 60, such as a waste heat source discussed in more detail below. In such circumstances, the working fluid may be directly heated or may be heated in a heat exchanger in which the working fluid receives heat from a byproduct fluid of the process. In certain instances, the working fluid can be heated with the heat source 60 so that the fluid is converted into a vapor phase (substantially or entirely). Heat source 60 may also indirectly heat the working fluid with a thermal fluid that carries heat from the heat source 60 to the evaporator 65. Some examples of a thermal fluid include water, steam, thermal oil, and/or other fluids.

In certain instances, working fluid at a low temperature and high pressure liquid phase is circulated from the pump device 30 into one side of a heat recovering heat exchanger, e.g., the economizer 50. Working fluid that has been expanded by a turbine upstream of a condenser, at a high temperature and low pressure vapor phase (substantially or entirely), is circulated into another side of the economizer 50. The two sides of the economizer 50 are thermally coupled to facilitate heat transfer there between. Although illustrated as separate components, the economizer 50 (if used) may be any type of heat exchange device, such as, for example, a plate and frame heat exchanger, a shell and tube heat exchanger or other device.

The evaporator 65 may receive the working fluid from the economizer 50 at one side and receive a supply of thermal fluid (that is or is from the heat source 60) at another side, with the two sides of the evaporator 65 being thermally coupled to facilitate heat exchange between the thermal fluid and working fluid. For instance, the working fluid enters the evaporator 65 from the economizer 50 in liquid phase (substantially or entirely) and is changed to a vapor phase (substantially or entirely) by heat exchange with the thermal fluid supply. The evaporator 65 may be any type of heat exchange device, such as, for example, a plate and frame heat exchanger, a tube and fin, a shell and tube heat exchanger or other device.

The working fluid may flow from the outlet conduit of the turbine generator apparatus 102 to a condenser heat exchanger 85 (by way of the economizer 50, if provided). The condenser 85 is used to remove heat from the working fluid so that the working fluid is converted to a liquid state (substantially or entirely). In certain instances, a forced cooling airflow or water flow is provided over the working fluid conduit or the condenser 85 to facilitate heat removal.

After the working fluid exits the condenser 85, the fluid may return to the liquid reservoir 20 where it is prepared to flow again though the Rankine cycle generator system 100.

Liquid separator 40 (if used) may be arranged upstream of the turbine generator apparatus 102 so as to separate and remove a substantial portion of any liquid state droplets or slugs of working fluid that might otherwise pass into the turbine generator apparatus 102. Accordingly, in certain instances of the embodiments, the vapor phase working fluid can be passed to the turbine generator apparatus 102, while a substantial portion of any liquid-state droplets or slugs are removed and returned to the liquid reservoir 20. In certain instances of the embodiments, a liquid separator may be located between turbine stages (e.g., between the first turbine wheel and the second turbine wheel, for multi-stage expanders) to remove liquid state droplets or slugs that may form from the expansion of the working fluid from the first turbine stage. This liquid separator may be in addition to the liquid separator located upstream of the turbine apparatus.

A controller 180 is coupled to one or more aspects of the Rankine cycle generator system 100 to provide operational control of the Rankine cycle components, including any valves, the pump 30, the turbine generator 102 and/or other aspects.

Figure 2A:
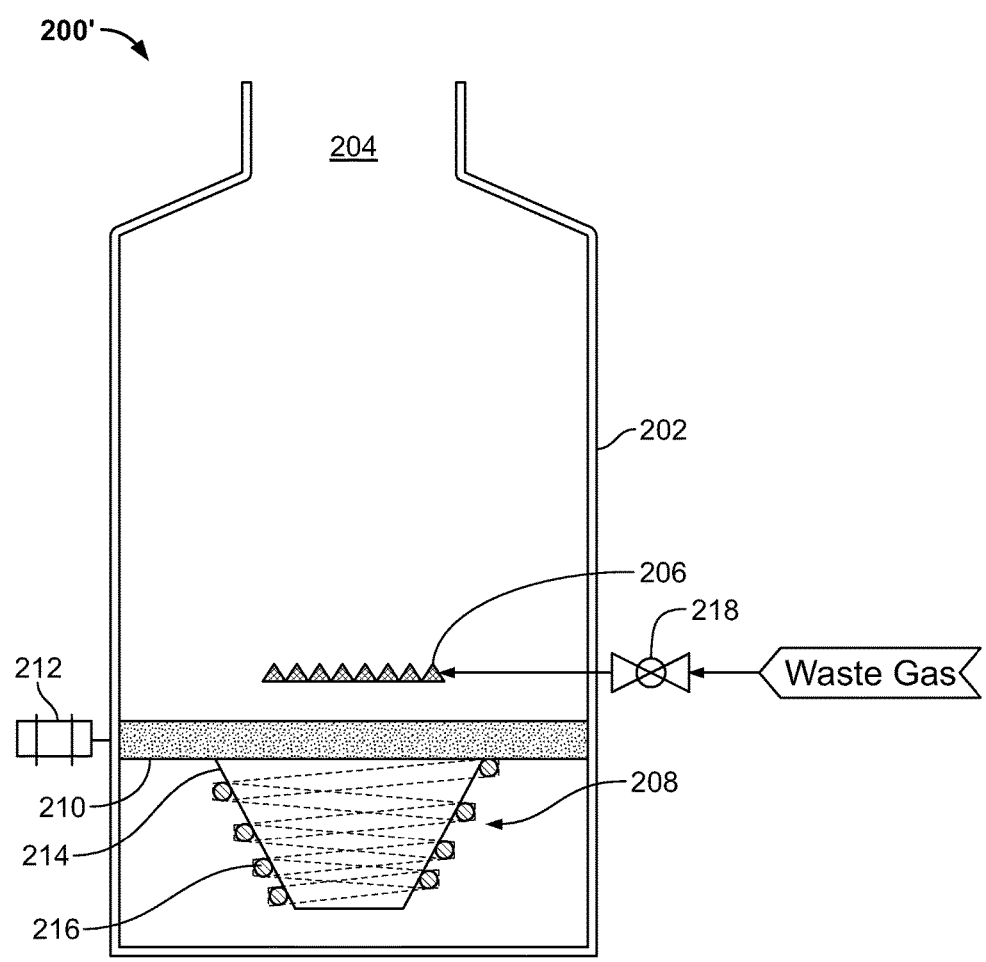
FIG. 2A is a schematic diagram of an example combined waste gas burner and thermal cycle heat exchanger system.

FIG. 2A is a schematic illustration of an example combined waste gas burner and thermal cycle heat exchanger system 200. The combined waste gas burner and thermal cycle heat exchanger system 200 is operable to capture the heat produced by burning waste gas. This heat energy is converted into other forms of energy using the thermal cycle (e.g., thermal cycle generator system 100). In the case of a Rankine cycle, the waste gas burner and thermal cycle heat exchanger system 200 is used as or with the Rankine cycle's evaporator and heat source (e.g., evaporator 65 and heat source 60 of FIG. 1B).

Figure 2B:
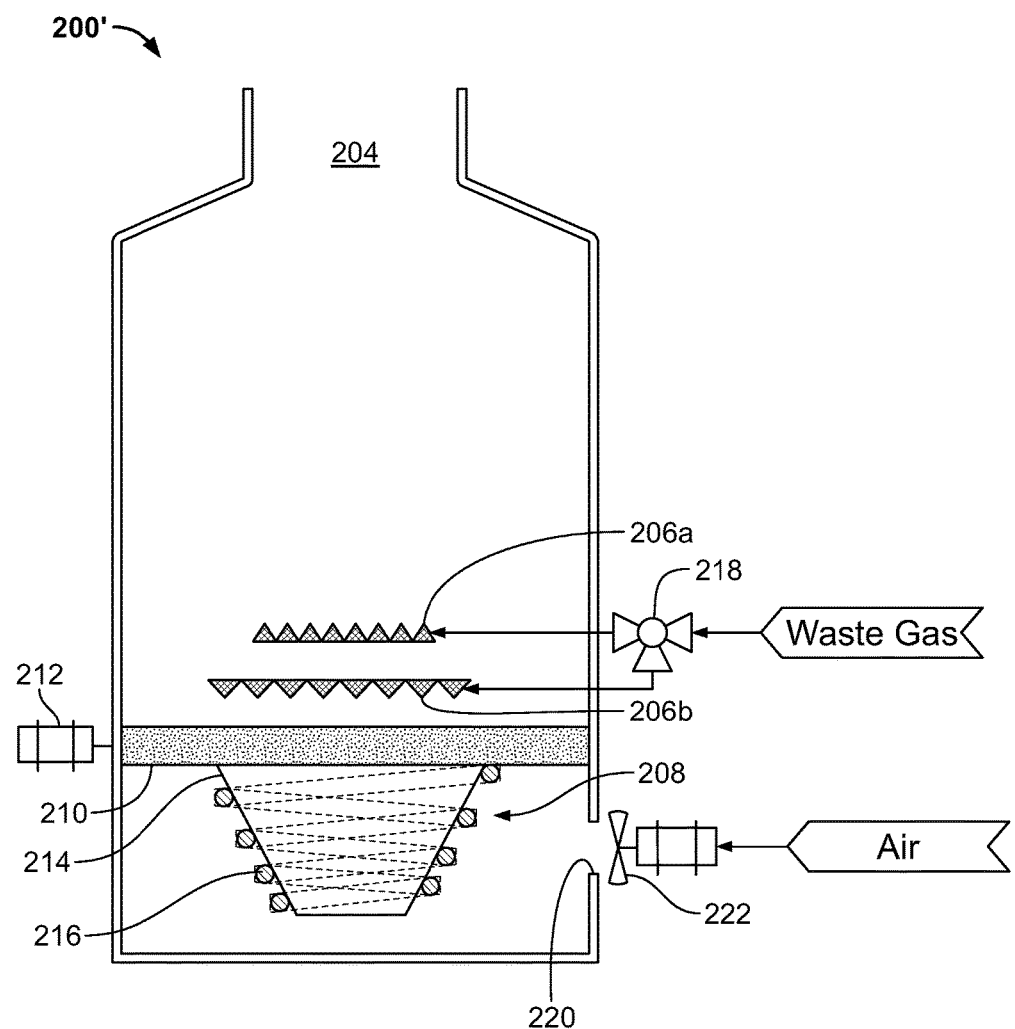
FIG. 2B is a schematic diagram of another example waste gas burner and thermal cycle heat exchanger system.

The waste gas burner and thermal cycle heat exchanger system 200 can include a housing 202 that defines a flue 204. In certain instances, the housing 202 can be that of an incinerator, a furnace, a burner, a flare, a thermal oxidizer, and/or another system for burning or destroying waste gas. To this end, waste gas is introduced into and burned with a burner 206 within the housing 202, which can be in various configurations to suit the application. In certain instances, the burner 206 is a burner configured to output its heat substantially as radiant heat, for example, outputting more radiant heat than convective heat. In one example, the burner 206 is an infrared burner having a high radiance emitter heated by the burning waste gas, such as metal alloy foam emitter, a ceramic emitter and/or another configuration of emitter. The burner 206 can have heat shields or be otherwise configured to direct and focus the radiant heat in a primary heating direction. The burner 206 can be more than one burner. In certain instances, the burner 206 can include multiple types of burners. FIG. 2B shows a configuration having a burner 206a configured primarily for efficient destruction of the waste gas, regardless of the type of heat output by the burner, and a burner 206b configured to output its heat substantially as radiant heat. In other instances, the burners 206a can be of the same configuration.

A heat exchanger 208 is positioned in the housing 202 adjacent to and out (substantially or entirely) of the upward convective heat flow from the burner 206. The burner's primary heating direction is oriented toward the heat exchanger 208 (i.e., down) and the heat exchanger 208 is in line of sight of the burner 206. Thus, the combustion byproducts and burnt impurities flow upward and exit through the flue 204, as does a substantial amount of the convective heat, and the radiant heat is directed downward toward the heat exchanger 208. The heat exchanger 208 may be associated with a thermal cycle in that it directly heats the thermal cycle working fluid and/or heats a heat exchange fluid that subsequently heats the working fluid, for example, via another heat exchanger outside of the housing 202. The burner 206 thus can be the heat source to the thermal cycle (e.g., heat source 60 of FIG. 1B) and the heat exchanger 208 can be the evaporator to the thermal cycle (e.g., evaporator 65) or used in heating the evaporator to the thermal cycle. With the heat exchanger out (substantially or entirely) of the upward convective heat flow from the burner 206, the combustion byproducts and impurities in the waste gas are carried up the flue 204 and away from the heat exchanger 208. Therefore, this reduces deposition of these combustion byproducts and impurities on the heat exchanger 208, and enables the system 200 to burn high impurity waste gas. In FIG. 2A, the heat exchanger 208 is shown below the burner 206. In other instances, the heat exchanger 208 can be positioned differently relative to the burner 206. For example, the heat exchanger 208 can be positioned to a side of the burner 206 and the burner's primary heating direction oriented to the side. Still other configurations exist.

In certain instances, the heat exchanger 208 can include a radiant heat collector 214 thermally coupled to coils 216. The coils 216 contain the thermal cycle working fluid or the heat transfer fluid that is used in transferring heat to the thermal cycle working fluid. The coils 216 can be coils of a tube type heat exchanger and/or another configuration. In certain instances, the coils 216 can be thermally bonded to the radiant heat collector 214 to achieve conductive heat transfer and/or can be thermally coupled in another manner.

In certain instances, the radiant heat collector 214 is conical to correspond with a cylindrical burner 206 and/or housing 202 or a triangular cross-section trough to correspond with a rectangular burner 206 and/or housing 202. Other shapes of collector 214, burner 206 and housing 202 exist and the shape of the collector 214 need not correspond with the shape of the housing 202. In a conical or trough style heat collector 214, the angle of the radiant heat collector 214 surfaces to the burner 206 can be selected in connection with the surface area and emissivity based on the desired of heat transfer. One or more surfaces of the heat collector 214 and/or coils 216 can have a specified emissivity selected based on the desired heat transfer. Further, the coils 216 can be sized in connection with the radiant heat collector 214. For example, in certain instances, the waste gas may burn at a temperature of five to ten times the operating temperature of the working fluid, and the burner 206, heat collector 214 and coils 216 can be sized or configured to maintain that ratio without overheating the working fluid.

Figure 3A:
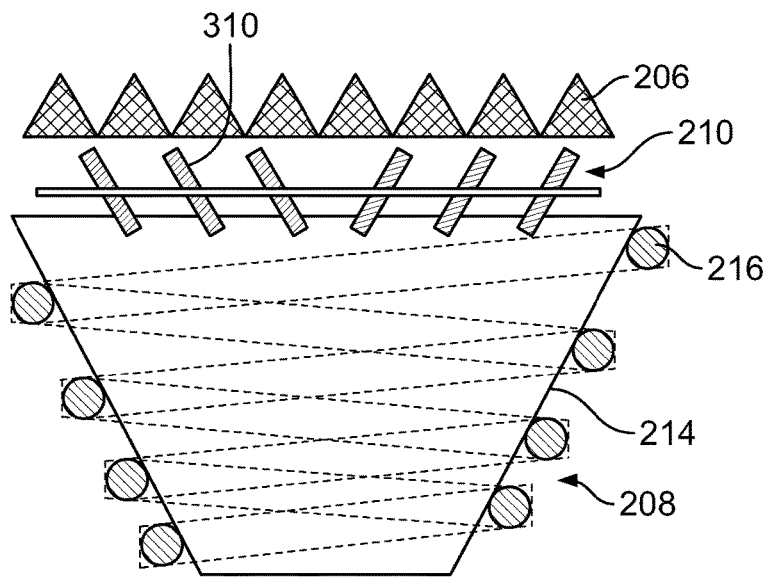
FIG. 3A is a detail side view of an example burner, heat valve and heat exchanger that could be used in the waste gas burner and thermal cycle heat exchanger system of FIG. 2A or 2B.

FIG. 3A shows a conical heat collector 214 oriented with its larger diameter end toward the burner 206. The coils 216 are coiled around the exterior of the heat collector 214. In certain instances, an interior surface of the heat collector 214 is treated and/or its material is selected to have a high emissivity oriented toward the burner 206, for example, higher than the emissivity of the outer surface of the heat collector 214 and/or the material of the collector not treated. In certain instances, the interior surface of the heat collector 214 can have an emissivity near one.

Figure 3B:
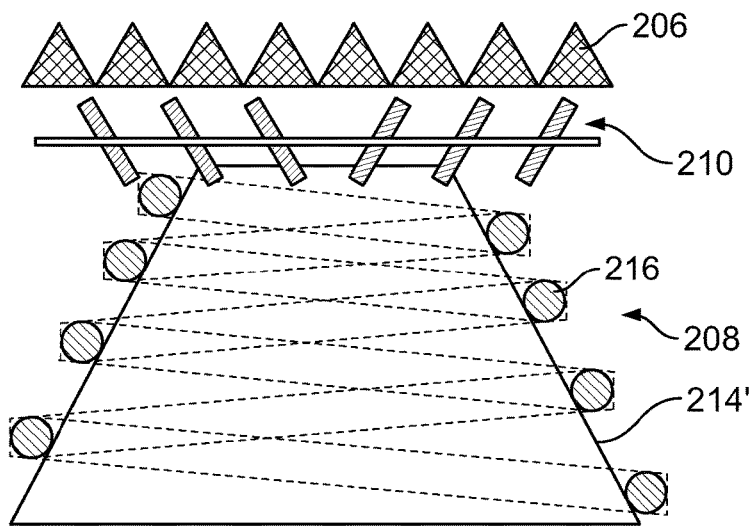
FIG. 3B is a detail side view of another example burner, heat valve and heat exchanger that could be used in the waste gas burner and thermal cycle heat exchanger system of FIG. 2A or 2B.

FIG. 3B shows a conical heat collector 214 oriented with its smaller diameter end toward the burner 206. The coils 216 are coiled around the exterior of the heat collector 214'. In certain instances, the exterior surface of the heat collector 214' and/or the coils 216 are treated and/or their materials selected to have a high emissivity oriented toward the burner 206, for example, higher than the emissivity of the interior surface of the heat collector 214, the material of the collector not treated and/or the material of the coils not treated. In certain instances, the exterior surface of the heat collector 214' and/or coils 216 can have an emissivity near one.

Figure 3C:
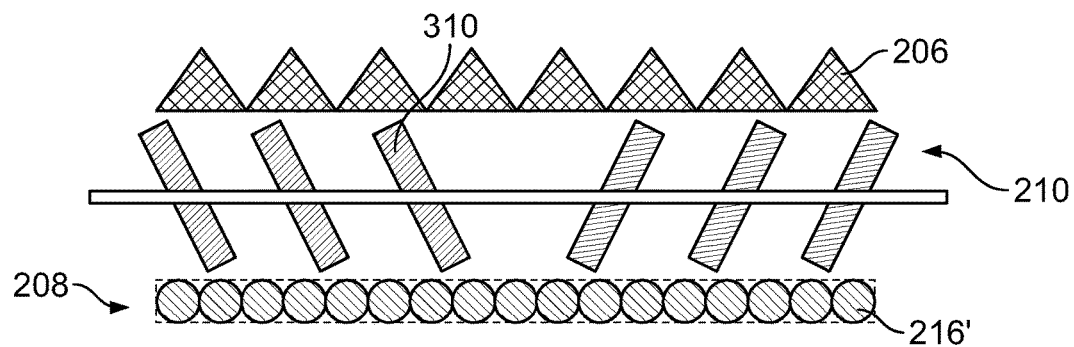
FIG. 3C is a detail side view of yet another example burner, heat valve and heat exchanger that could be used in the waste gas burner and thermal cycle heat exchanger system of FIG. 2A or 2B.

FIG. 3C shows a heat exchanger having only coils 216', without a heat collector. The coils 216' are coiled in a spiral arrangement in a common plane. In certain instances, the exterior surface of the coils 216' are treated and/or their materials selected to have a high emissivity oriented toward the burner 206. In certain instances, the exterior surface of the coils 216' can have an emissivity near one.

Turning to any of FIGS. 3A-3C, a heat valve 210 is positioned between the burner 206 and the heat exchanger 208, and can be operated to adjust and regulate the amount of heat, including radiant heat, transferred to the heat exchanger 208. The heat valve 210 can be controlled to open, close or reside at an in-between state, to maintain the working fluid of the thermal cycle within a specified operating temperature range, and below a maximum specified temperature, for example, based on a temperature at which the working fluid begins to degrade or decompose. Additionally, if the thermal cycle system is shut down, the heat valve 210 can be closed to allow waste gas to continue to be burned while the valve 210 protects the working fluid from high temperatures and subsequent degradation or decomposition. The valve 210 can fail safe closed to allow the waste gas to continue to be burned if the heat valve 210 were to fail. The valve 210 can have surfaces of low emissivity to reduce heat transfer with the valve 210 itself. For example, the valve can be metal and the surfaces of the valve 210 polished to achieve a low emissivity. In certain instances, the surfaces of the valve 210 can have an emissivity near zero.

Figure 4:
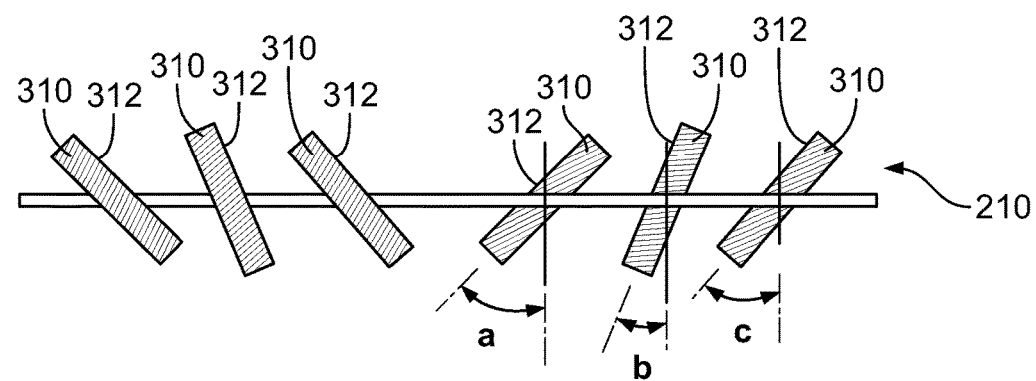
FIG. 4 is a detail side view of an example heat valve having independently adjustable louvers.

The heat valve 210 can be implemented in a number of different forms. For example, the heat valve 210 can be one or more butterfly valves that circumscribe the interior of the housing 202, a gate that moves laterally, louvers and/or be another configuration. FIGS. 3A-3C depict an example implementation of the heat valve 210 as louvers 310 carried to rotate about their center. When closed, the louvers 310 meet end to end to block radiant heat transfer to the heat exchanger 208. At least a burner facing surface 312 (shown in FIG. 4) of the louvers 310, and in some instances some or all remaining surfaces, are manufactured with a low emissivity, such as a polished metal surface and/or another low emissivity surface, to reduce or minimize heat transfer from the burner 206. The louvers 310 can be coupled to move between open and closed together, or as shown in FIG. 4, one or more of the louvers 310 can be configured to move independent of the others. FIG. 4 is a detail side view of an example heat valve 210 having independently adjustable louvers 310. For example, FIG. 4 shows the louvers 310 at three different angles a, b and c from the direction of radiant heat flow (vertical in the figure).

The heat valve 210 can include a control motor 212 that is coupled to a controller (e.g., controller 180 of FIG. 1) to enable automated control of the valve 210 and/or the valve 210 can be manually controlled. The motor 212 could be a single motor or multiple motors, for example, to facilitate independent control of each of the louvers or sets of louvers. A portion of the electric power produced by the thermal cycle system can be used to operate the valve 210 and/or the valve 210 can be operated from power sourced outside of the thermal cycle system. In certain instances, the valve 210 can be used with a temperature sensor that measures the temperature of the heat exchanger 208 and/or the working fluid proximate the heat exchanger 208. Information from the temperature sensor can be used by an operator and/or the controller to adjust and regulate the amount of heat transferred to the heat exchanger 208.

Additionally, or alternatively, a source of quench fluid can be available to be supplied into the region around the heat exchanger 208 to help adjust and regulate the heat transfer. For example, FIG. 2B shows a port 220 and fan 222 that provides ambient air as a quench fluid to cool the heat exchanger 208.

The flow of waste gas into the burner 206 can be controlled by a valve 218 in the line feeding the waste gas to the burner 206. The valve can be adjusted to increase or decrease the amount of gas supplied to the burner 206, and thus correspondingly increase or decrease the temperature of the burner 206. The valve can be adjusted manually and/or the valve 218 can include an actuator coupled to a controller (e.g., controller 180 of FIG. 1B) that automatically controls the valve 218. If the controller is controller 180 or another controller that communicates with aspects of the thermal cycle generator system, the valve 218 and burner 206 can be controlled in concert with the operation of the thermal cycle. For example, the valve 218 can be opened and closed in relation to when the thermal cycle generator system is turned on and off, respectively. The valve 218 can be regulated differently in start-up of the thermal cycle than in shut down of the thermal cycle. In another example, the controller can close and/or differently regulate the valve 218 if the heat valve 210 fails. In the configuration of FIG. 2B, the valve 218 of thermal cycle generator system 200' has a dual flow control capability to allow independent or coupled control of the flow of gas to burner 206a and 206b. Therefore, the burner 206b can be controlled using the valve 218 to maintain a desired temperature, while burner 206a can be controlled to maintain a desired destruction of waste gas.

In certain instances the controller of the thermal cycle (e.g., controller 180 of FIG. 1B) and/or one or more other controllers can be coupled to one or more of the valve 218, quench fluid control, heat valve 210 and/or other aspects of the thermal cycle to control the operation of the thermal cycle generator system in concert with the operation of the burning of waste gas.

Figure 5:
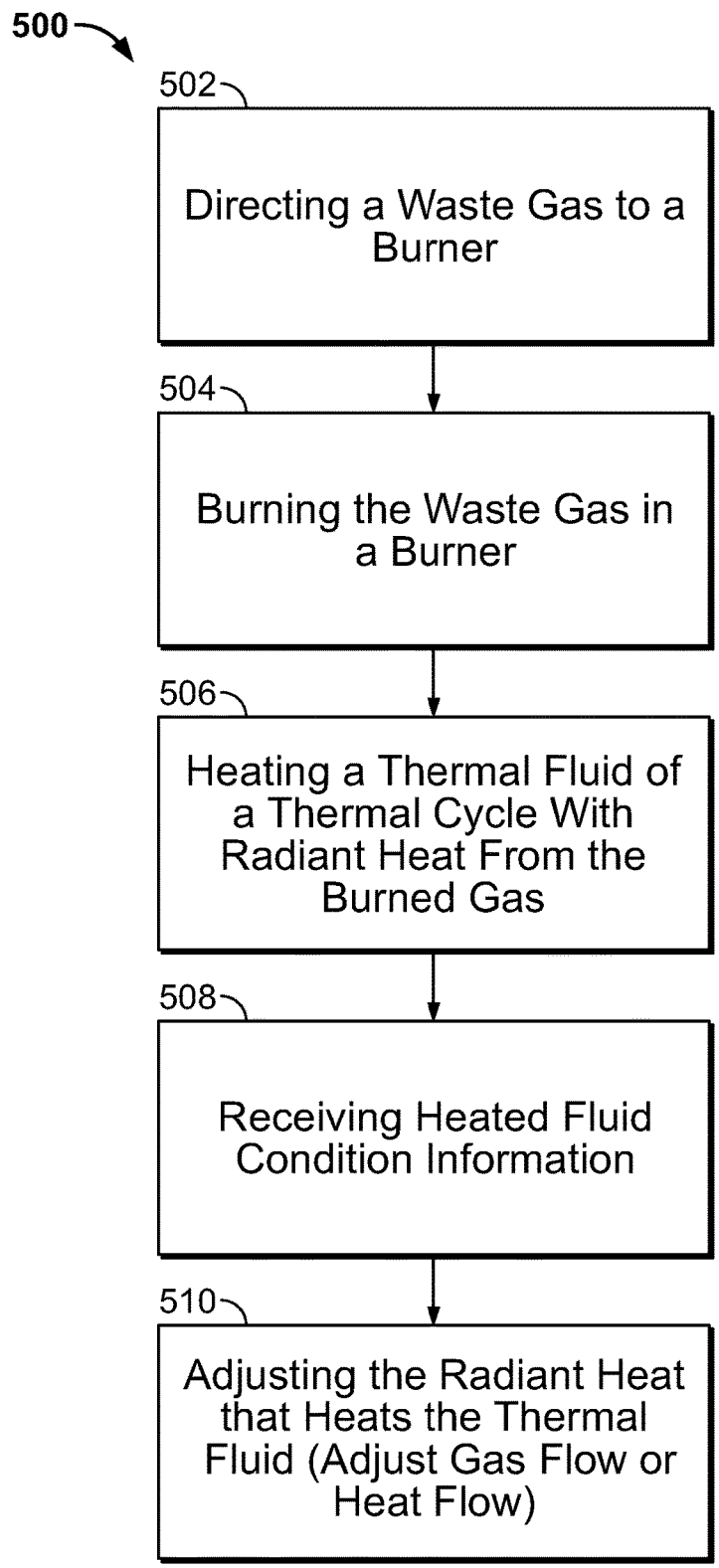
FIG. 5 is a process flow diagram for heating a working fluid using a waste gas burner system.

FIG. 5 is a process flow diagram 500 for heating a working fluid using a waste gas burner system. A waste gas can be directed to a burner (502). The burner can be a single burner or can include multiple burners. In some implementations, the burner can produce (or can be configured to produce) more radiant heat that convective heat. The burner can burn the waste gas (504). The radiant heat from the burned waste gas can be used to heat a working fluid of a closed-loop thermal cycle (506). The working fluid condition can be monitored, and that information can be received by a controller controlling the thermal cycle or a controller controlling the burner (which may be one and the same) (508). The controller can adjust the amount of heat used to heat the working fluid (510). For example, the controller can adjust the gas flow to the burner by controlling a gas flow valve. By changing the gas flow, the radiant heat output from the burner can be increased or reduced. The controller can adjust the amount of radiant heat that reaches the heat exchanger by selectively adjusting one or more heat valves or louvers that reside between the burner and the heat exchanger. The heat valves or louvers can be adjusted together, individually, or in sets. By adjusting the heat valves or louvers, the amount of radiant heat that reaches the heat exchanger from the burner can be adjusted and controlled. Other aspects can also be controlled. For example, a quenching fluid mass flow rate and/or temperature can be controlled to regulate the heat exchanger. The working fluid mass flow rate can also be adjusted by the controller.

A number of embodiments have been described. Nevertheless, it will be understood that various modifications may be made. Accordingly, other embodiments are within the scope of the following claims:

What is claimed is:

1. A fuel burner system comprising:
   a housing comprising a flue at an upper end of the housing;
   a burner positioned within the housing, the burner configured to burn gas to produce burned gas and output radiant heat;
   a gas valve controlled by the system to regulate the flow of gas to the burner; and
   a heat exchanger positioned within the housing, the heat exchanger associated with a thermal cycle to receive the radiant heat output by the burned gas and to heat a thermal fluid of the thermal cycle with the radiant heat, the heat exchanger positioned out of a convective heat flow from the burner, wherein the burner is positioned between the flue and the heat exchanger to flow the burned gas upwards to the flue and to direct the radiant heat downwards to the heat exchanger.

2. The fuel burner system of claim 1, where the heat exchanger is below the burner, and wherein the burner is configured to direct and focus the radiant heat in a primary direction toward the heat exchanger below the burner.

3. The fuel burner system of claim 1, where the burner comprises a first burner and a second burner, the second burner nearer the heat exchanger than the first burner, the first burner configured to burn gas than output radiant heat and the second burner configured to output radiant heat than burn gas.

4. The fuel burner system of claim 1, wherein the thermal cycle is a Rankine cycle.

5. The fuel burner system of claim 1, wherein a quenching fluid is used to control the temperature of the heat exchanger.

6. The fuel burner system of claim 5, wherein the quenching fluid comprises air.

7. The fuel burner system of claim 1, further comprising a control system configured to coordinate one or more of the flow of gas to be burned, heat valve operation, quenching fluid, or working fluid flow.

8. The fuel burner system of claim 1, further comprising a heat valve between the burner and the heat exchanger, the heat valve comprising at least one low emissivity burner facing surface to minimize heat transfer from the burner, the heat valve being selectively adjustable to adjust heat transfer to the heat exchanger.

9. A method comprising:
   burning a fuel using a burner to produce radiant heat from the burned gas, wherein the burner is positioned within a housing;
   directing the burned gas upward to a flue positioned above the burner, wherein the flue is positioned at an upper end of the housing;
   directing the radiant heat to a heat exchanger positioned within the housing and below the burner; and
   heating a thermal fluid of a thermal cycle with the radiant heat using the heat exchanger associated with the thermal cycle, the heat exchanger positioned out of an upward convective heat flow from the burner.

10. The method of claim 9, wherein a heat valve is selectively adjustable to adjust heat transfer to the heat exchanger.

11. The method of claim 9, further comprising regulating the flow of gas to the burner based on a condition of the working fluid.

12. The method of claim 9, wherein the heat exchanger is below the burner.

13. The method of claim 9, wherein the burner comprises a first burner and a second burner, the second burner nearer the heat exchanger than the first burner, the first burner configured to burn gas than output radiant heat and the second burner configured to output radiant heat than burn gas.

14. The method of claim 9, further comprising controlling the temperature of the heat exchanger using a quenching fluid.

15. The method of claim 14, wherein the quenching fluid comprises air.

16. The method of claim 9, further comprising coordinating one or more of the flow of gas to be burned, heat valve operation, quenching fluid, or working fluid flow.

17. The method of claim 9, further comprising adjusting a heat valve to control heat transfer to the heat exchanger.

18. A closed-loop thermal cycle system comprising:
an electric machine comprising:
a rotor; and
a stator configured to support the rotor to rotate within the stator, the electric machine system configured to generate electricity based on rotation of the rotor within the stator;
a heat exchanger upstream of the electric machine; and
a waste gas burner system comprising:
a housing comprising a flue at an upper end of the housing;
a burner positioned within the housing, the burner configured to burn a waste gas to produce burned gas and output radiant heat, wherein the heat exchanger is positioned within the housing, resides outside of a convective heat flow from the burner and is configured to heat a thermal fluid of the closed-loop thermal cycle based on the radiant heat from the burner, wherein the burner is positioned between the flue and the heat exchanger to flow the burned gas upwards to the flue and to direct the radiant heat downwards to the heat exchanger, and
a gas valve to regulate the flow of gas to the burner and controlled by the system.

19. The closed-loop thermal cycle system of claim 18, wherein the heat exchanger resides below the burner.

20. The closed-loop thermal cycle system of claim 18, wherein the burner comprises a first burner and a second burner, the second burner nearer the heat exchanger than the first burner, the first burner configured to burn gas than output radiant heat and the second burner configured to output radiant heat than burn gas.

21. The closed-loop thermal cycle system of claim 18, wherein the closed-loop thermal cycle is a Rankine cycle.

22. The closed-loop thermal cycle of claim 18, further comprising a control system configured to coordinate one or more of the flow of gas to be burned, heat valve operation, quenching fluid, thermal fluid flow, or working fluid flow.

23. The closed-loop thermal cycle of claim 18, wherein the waste gas burner system further comprises a heat valve between the burner and the heat exchanger, the heat valve being selectively adjustable to adjust heat transfer to the heat exchanger.

24. The fuel burner system of claim 1, wherein the burner comprises an infrared burner with a radiance emitter heated by the burned gas, wherein the infrared burner is configured to output more radiant heat than convective heat.

25. The fuel burner system of claim 1, wherein the heat exchanger is positioned relative to the burner to heat the thermal fluid of the thermal cycle to a level sufficient to operate the thermal cycle with the radiant heat alone, wherein a quantity of conductive or convective heat output by the burned gas is not sufficient to heat the thermal fluid of the thermal cycle to the level sufficient to operate the thermal cycle.

* * * * *

UNITED STATES PATENT AND TRADEMARK OFFICE
CERTIFICATE OF CORRECTION

PATENT NO. : 9,551,487 B2
APPLICATION NO. : 13/785817
DATED : January 24, 2017
INVENTOR(S) : Parsa Mirmobin and Dennis Strouse It is certified that error appears in the above-identified patent and that said Letters Patent is hereby corrected as shown below:

In the Claims

Column 10, Line 18, Claim 22, after "cycle" insert --system--.

Column 10, Line 22, Claim 23, after "cycle" insert --system--.

Signed and Sealed this
Ninth Day of April, 2019

Andrei Iancu
*Director of the United States Patent and Trademark Office*